(12) United States Patent  (10) Patent No.: US 9,179,604 B2
Adams  (45) Date of Patent: Nov. 10, 2015

(54) CUTTING TOOL AND METHOD OF CUTTING

(76) Inventor: Ian William Adams, Hastings (NZ)

( * ) Notice: Subject to any disclaimer, the term of this patent is extended or adjusted under 35 U.S.C. 154(b) by 313 days.

(21) Appl. No.: 13/375,963

(22) PCT Filed: Jun. 4, 2010

(86) PCT No.: PCT/NZ2010/000110
§ 371 (c)(1),
(2), (4) Date: Dec. 2, 2011

(87) PCT Pub. No.: WO2010/140906
PCT Pub. Date: Dec. 9, 2010

(65) Prior Publication Data
US 2012/0073190 A1    Mar. 29, 2012

(30) Foreign Application Priority Data

Jun. 5, 2009 (NZ) .......................................... 577495

(51) Int. Cl.
*A01G 1/00* (2006.01)
*A01G 1/06* (2006.01)

(52) U.S. Cl.
CPC ........................................ *A01G 1/06* (2013.01)

(58) Field of Classification Search
CPC ............. A01G 1/06; A01G 3/00; A01G 7/00; B26D 1/085; B26D 7/01; B27G 19/02; B26B 27/00; B26B 5/005; B26B 25/005

USPC .................................................... 47/6, DIG. 3
See application file for complete search history.

(56) References Cited

U.S. PATENT DOCUMENTS

| 713,950 | A | * | 11/1902 | Burrell | ................................ | 47/6 |
| 796,160 | A | * | 8/1905 | Speer | ................................ | 47/6 |
| 2,219,654 | A | * | 10/1940 | La Fata | ................................ | 47/6 |
| 4,014,132 | A | * | 3/1977 | Cook | ................................ | 47/6 |
| 4,098,020 | A | * | 7/1978 | Cook | ................................ | 47/6 |
| 4,769,944 | A | * | 9/1988 | Fresne et al. | ................................ | 47/6 |
| 6,918,205 | B1 | * | 7/2005 | Sowinski | ................................ | 47/6 |
| 2011/0005127 | A1 | * | 1/2011 | Fornasier et al. | ................................ | 47/6 |

FOREIGN PATENT DOCUMENTS

| FR | 2561860 | * | 10/1985 | ............... | A01G 1/06 |
| SU | 470280 |  | 5/1975 |  |  |
| SU | 670277 |  | 6/1979 |  |  |

* cited by examiner

*Primary Examiner* — Andrea Valenti
(74) *Attorney, Agent, or Firm* — Blakely Sokoloff Taylor & Zafman LLP

(57) ABSTRACT

A whip and tongue grafting device may include a slanting cut tool including a guide to position stem for receiving a slanting cut, and including a cutting device for making the slanting cut. The device may also include a whip cut tool including a guide to position a stem for receiving a tongue cut, and including a cutting device for making the whip cut. The device may also include other guides for producing other required cuts to the stem.

12 Claims, 6 Drawing Sheets

CUTTING TOOL AND METHOD OF CUTTING

CROSS-REFERENCE TO RELATED APPLICATION

The present patent application is a national phase application of International Application No. PCT/NZ2010/000110, filed Jun. 4, 2010.

FIELD OF THE INVENTION

This invention relates to a whip and tongue grafting tool and methods for its use.

BACKGROUND OF THE INVENTION

Whip and tongue grafting is a well-known method for grafting the scion and rootstock of two plants together. The advantage of whip and tongue grafting is that it provides a relatively sturdy join and in theory is comparatively simple to do.

Current methods for performing a whip and tongue graft include simply using a knife to make the two main types of cut, or using a knife combined with a guide to give consistent results. These techniques are simple, but have the disadvantage of being giving inconsistent cuts as in the first case or being relatively complex to perform as in the second case.

It is an object of the invention to provide an improved whip and tongue apparatus and method, or to at least provide the public with a useful choice.

SUMMARY OF THE INVENTION

According to one exemplary embodiment there is provided a grafting tool for providing a tongue cut for grafting, comprising:
 i. at least one guide for guiding a cut stem to be grafted in a desired direction; and
 ii. at least one blade held such that when a cut stem is guided along the guide the cutting edge forms a longitudinal cut along the stem.

According to another exemplary embodiment there is provided a cutting tool for cutting a stem into two parts for the purpose of performing a whip and tongue graft, comprising:
 i. at least one guide for positioning the stem at a desired angle;
 ii. at least one blade able to move relative to the guide; and
 iii. means for moving the blade so it cuts completely though stem such that the cut is across the width of the stem, where the angle of the cut is set by the guide.

According to a further exemplary embodiment there is provided a method for producing a whip and tongue graft on a stem, the method consisting of a first operation of:
 i. placing a stem into a guide that is used to hold the stem in place, where the guide can be angled with respect to a cutting instrument; and
 ii. operating a cutting instrument so as to cut the stem into two, such that the cut may be angled with respect to the stem;
and a second operation of:
 i. placing a cut stem so the cut surface is facing a blade edge, in a guide for aligning the stem with the blade;
 ii. moving the stem with respect to the blade so as to produce a tongue cut; and
 iii. removing the stem by pulling it away form blade.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION OF EMBODIMENTS OF THE INVENTION

Figure 1:
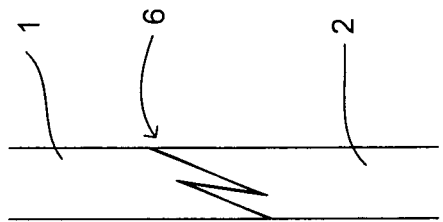
FIG. 1 shows a method of creating a whip and tongue graft.
Figure 1:
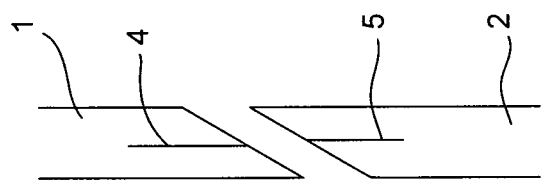
Figure 1:
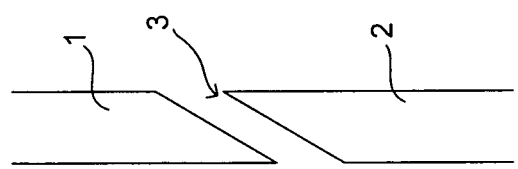
Figure 1:
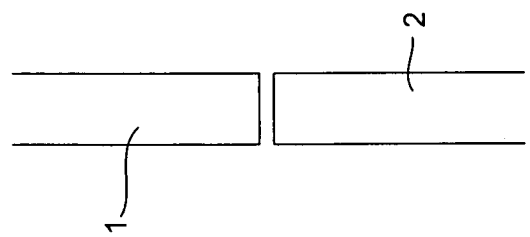

FIG. 1 refers to the technique of whip and tongue grafting showing a stem 1 and rootstock 2 to be grafted. A 'slant' cut 3 is made to each end that is to be grafted together, the angle of the slant cut is consistent for both the stem and rootstock. The next step is to make 'tongue' incisions into both pieces, where the incision in both case is along the same direction as the stem/rootstock, and made such that the end of the stem splits into a lower half and an upper half. The splitting is exaggerated in FIG. 1 at the points 4 and 5, and it is noted that the straight cut does not remove part of the stem. The incision is typically a few centimeters long. The final step 6 is to combine the two pieces such that the lower half in each case is inserted into the gap made by the tongue cut. Typically the combined grafted stem will be held together using a bandage or other means until the combined plant has fused together.

Figure 2:
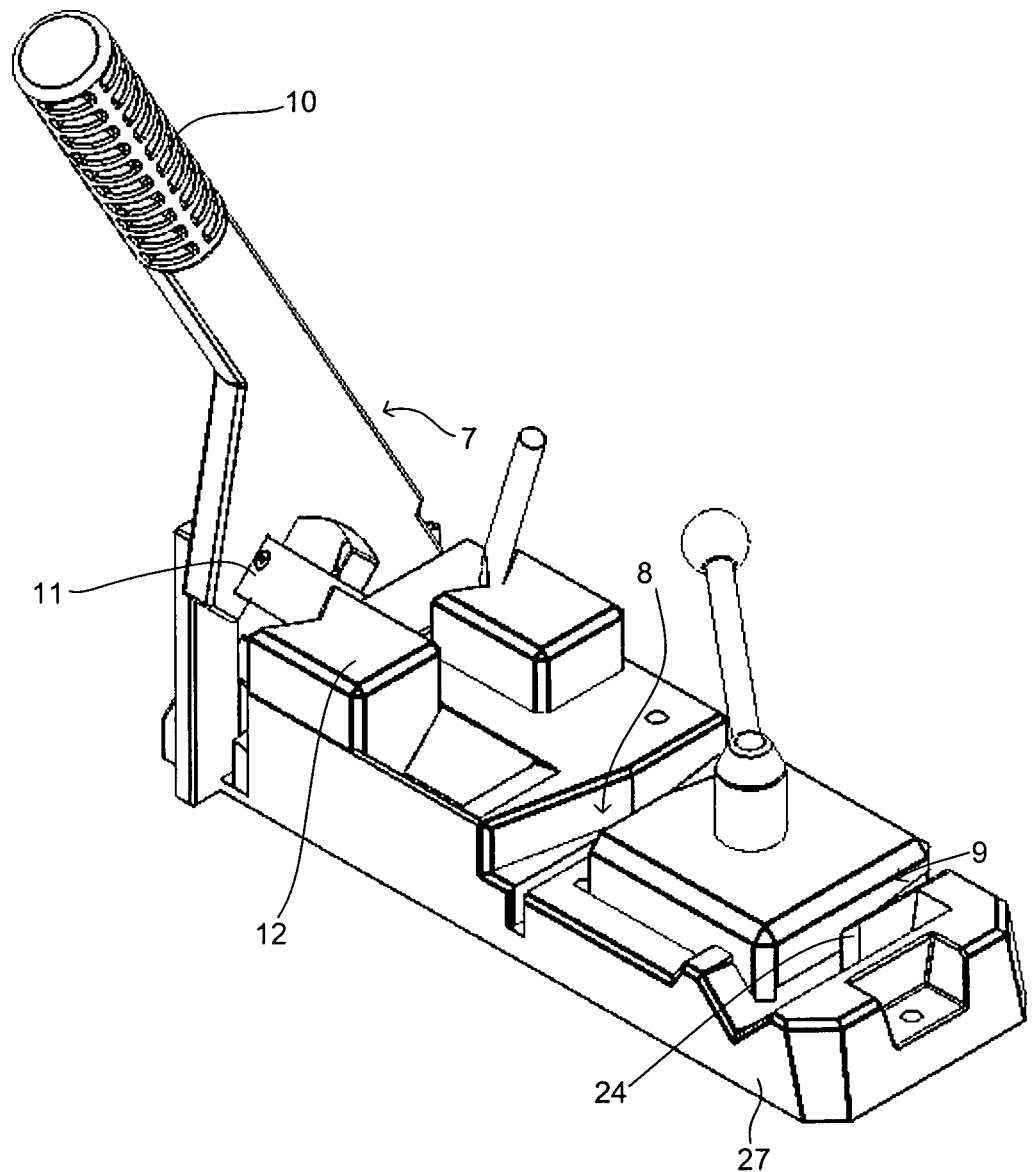
FIG. 2 shows a whip and/or tongue grafting tool.

The present invention is designed to assist in the creation of a whip and tongue graft. FIG. 2 shows an isometric view of one embodiment of the invention. The tool includes a body and having a cutting tool 7 for making slanting, tongue and horizontal cuts to the stem, a guide 8 for making slanting cuts using a circular saw or similar external cutting device, and a fixed blade 24 with a guide 9 for performing the tongue style cuts.

Figure 3:
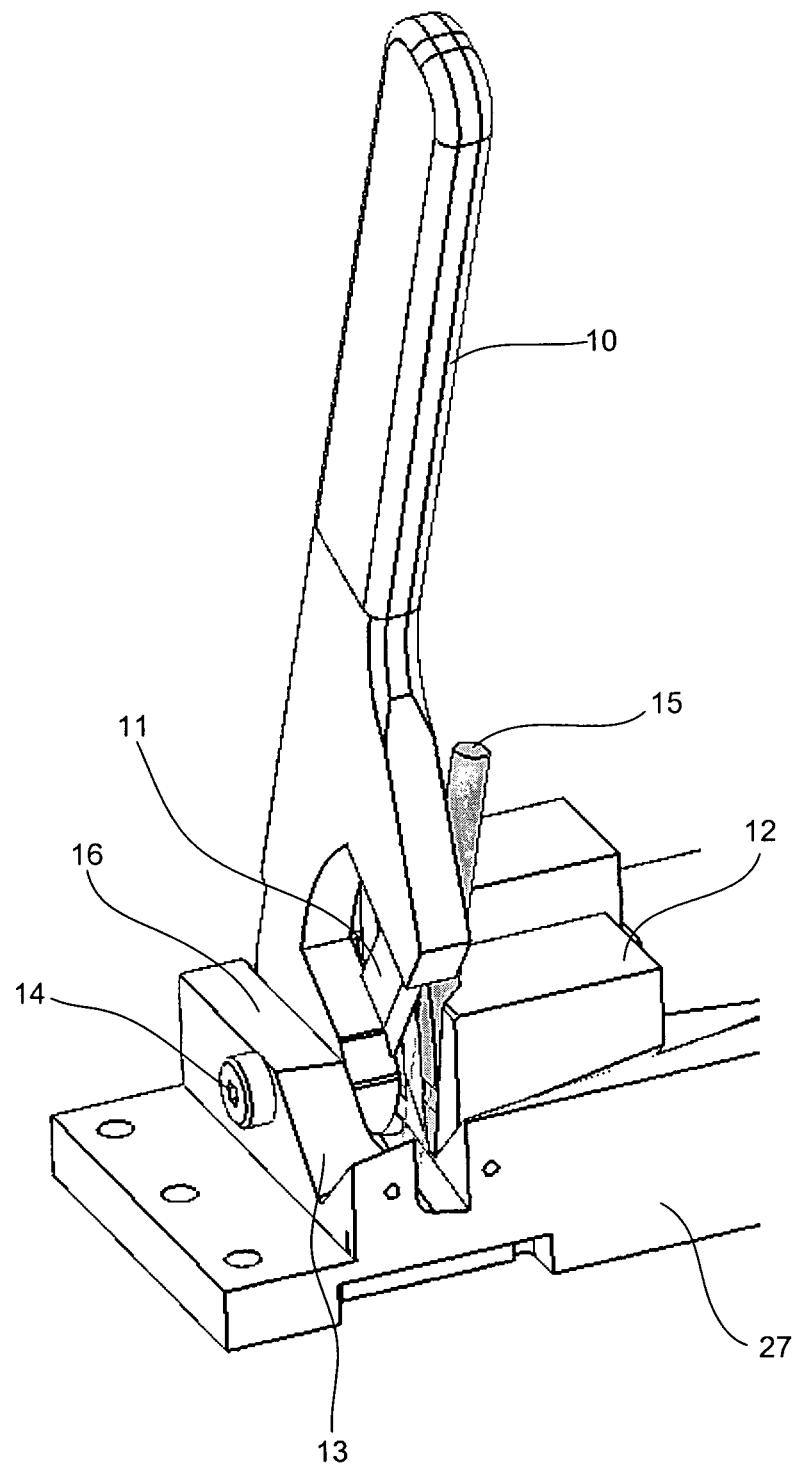
FIG. 3 shows the blade-cutting component for performing cross and/or slanting cuts.

In one embodiment, as shown in FIG. 3, the cutting tool 7 includes a pivotally mounted blade 11 with handle 10 allowing a user to applying a cutting force to the stem. The guide 12 positions the stem to provide the correct cutting angle for the slanting cut, with the guide 12 being an adjustable guide. Guide 12 holds the stem at the correct angle for performing a slanting cut, whilst guide 13 holds the stem when performing a horizontal cut. The handle pivots about bearing 14. To perform a slanting cut, the stem 15 is placed in the guide 12 with the blade located in a position above the stem. Holding the stem or otherwise ensuring it is held in position, the blade is bought down by pushing down on the handle, and a slanting cut is produced. The stem can then be removed and the remaining part discarded or saved for later use.

Another use for the pivotal cutting blade 11 is for producing horizontal cuts of the stem to allow multiple pieces to be produced. By laying the stem flat across the faces 16 and 12, the stem may be cut into two parts by the action of pulling down on the handle 10 of the hinged cutting blade; forcing the blade 11 to cut entirely through the stem.

Figure 4:
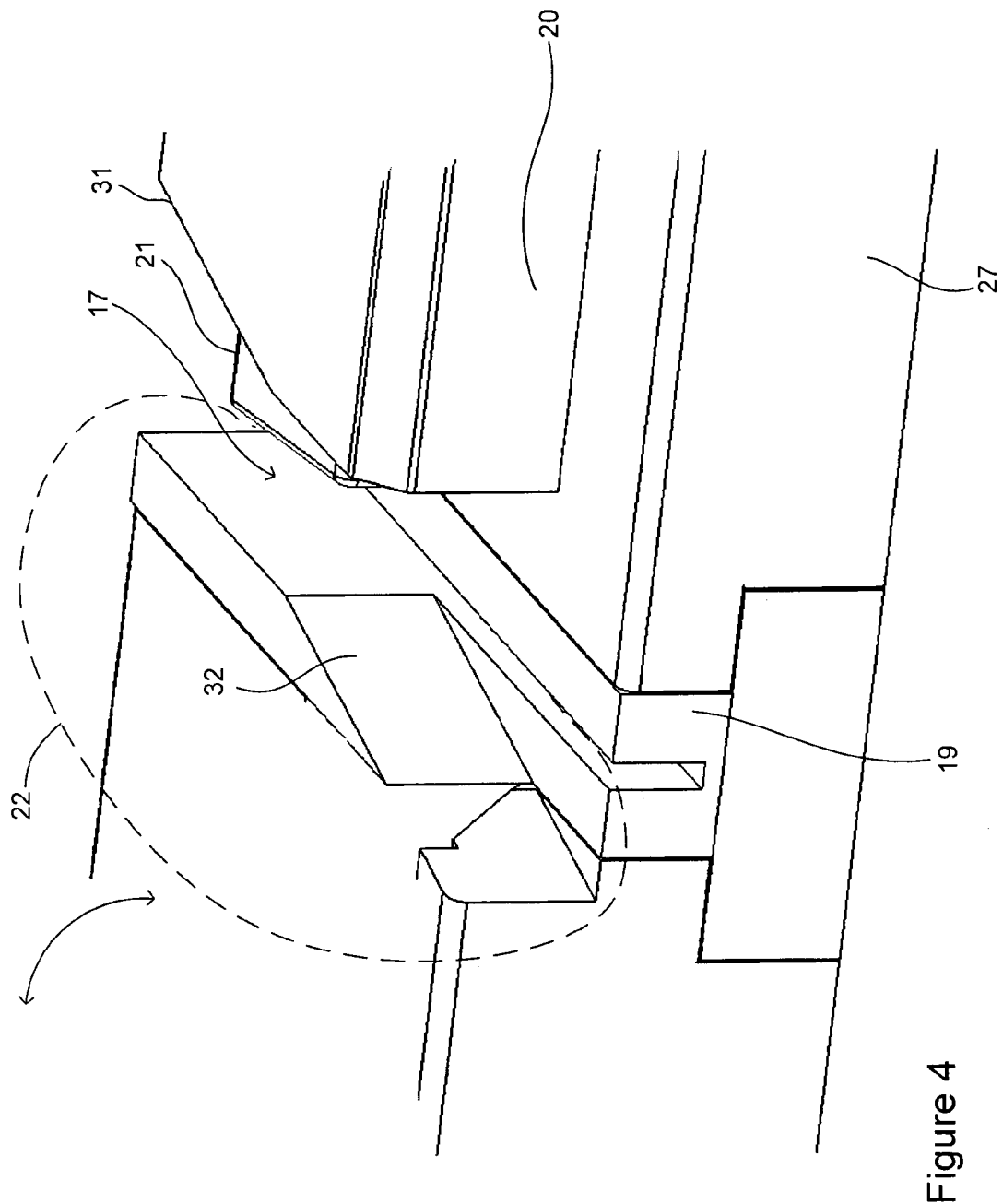
FIG. 4 shows the tool using a circular saw.
Figure 5:
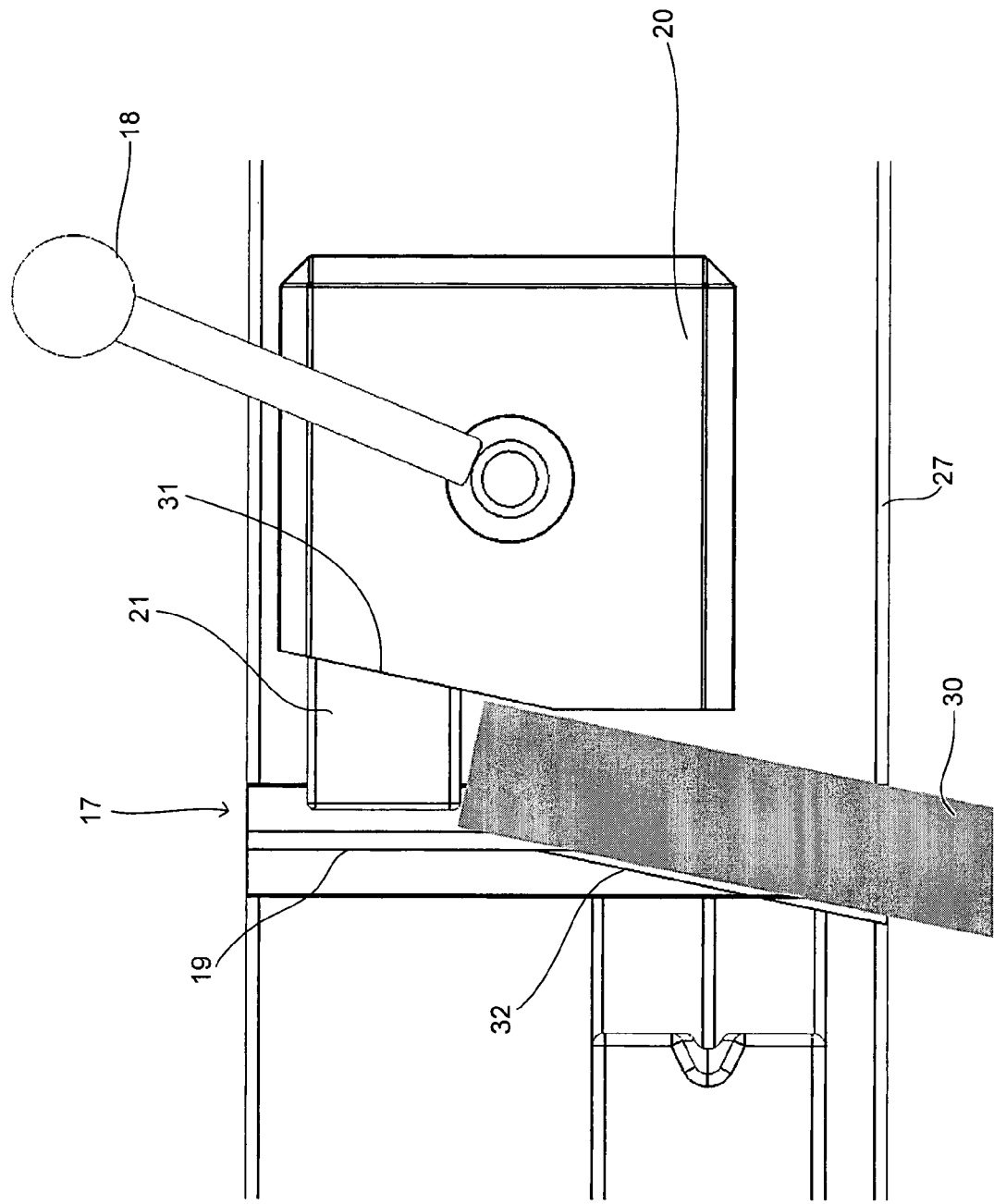
FIG. 5 shows the tool using a circular saw, illustrating the positioning of the stem for cutting.

FIGS. 4 and 5 show another cutting tool component of the invention. A circular saw 22 is used to cut thick and/or hard stems. A stem 30 is placed in the guide 17, which can be adjusted in width by sliding block 20 along guide 21, and fixing in place using the tightening mechanism 18 (see FIG. 5 for a top down view of the adjustable guide and stem). The guide 17, formed by faces 31 and 32, is designed to hold the stem at an angle to the plane of the cutting blade. While the stem is held secure either by the operator or other means, a cutting blade 22, for example a circular saw, may be used to cut through the stem. The recess 19 is designed to allow the blade to cut through the stem without damaging the tool. The circular saw 22 is shown in doted lines in FIG. 4.

Figure 6:
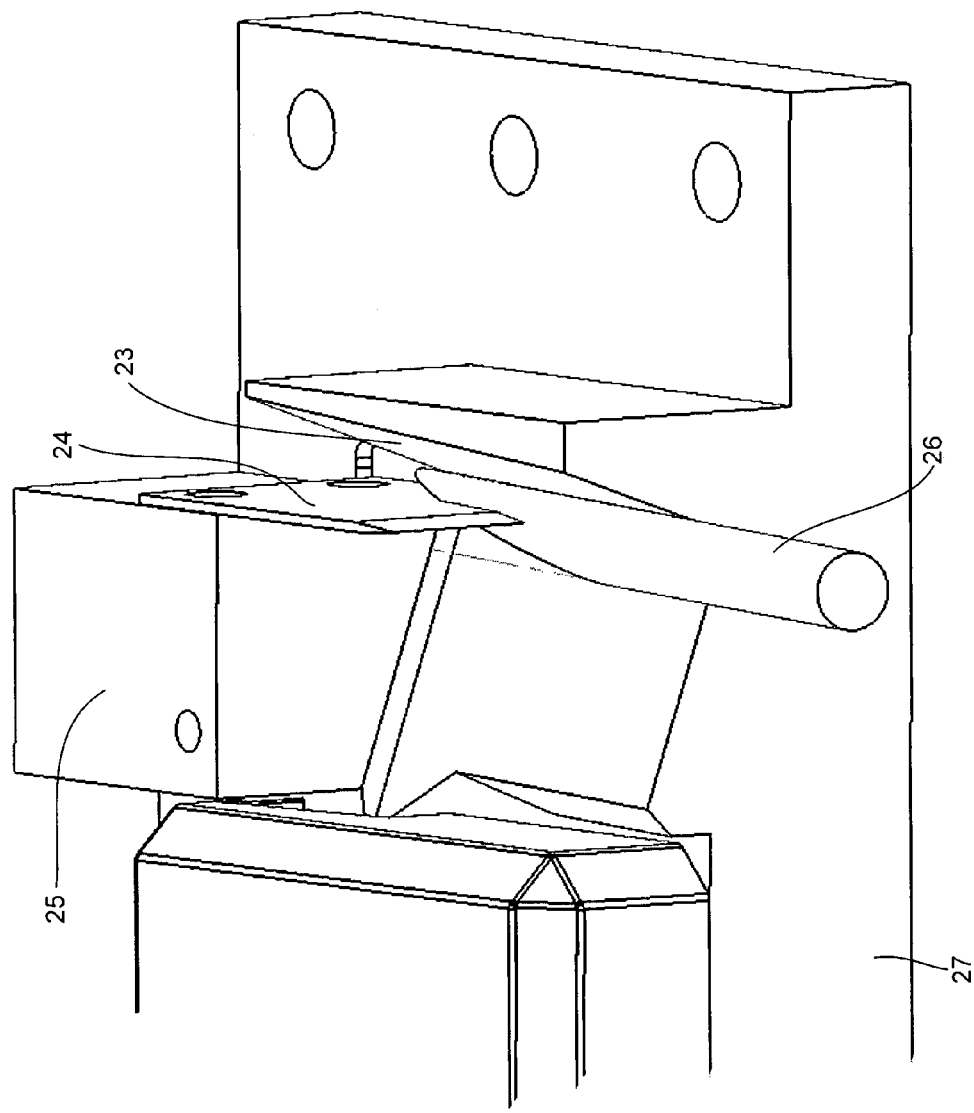
FIG. 6 shows the tongue cut component

FIG. 6 shows the tongue cut section of the tool. The cutting blade 24 is fixed to block 25 that is fixed permanently to the body 27 of the tool. A guide 23 is provided to help align the stem correctly in front of the blade, so that the long side of the slant cut is on one side of the blade, and the short side the other. By pushing the stem into the blade, ensuring the stem stays in the guide, a tongue cut may be made to the desired depth. The stem is simply pulled backwards for removal.

In another aspect, the cutting blade 11 may be used to produce a tongue cut on the stem. A guide may be incorporated onto the device such that the stem may be held with the slant cut face facing directly towards the cutting side of the attached cutting blade. By pulling the lever towards the stem, the blade may make an incision up to the desired depth. This technique works well with smaller stems, whereas the specialty tongue cut blade is preferred for larger stems.

In the tool described, the three components of: cutting blade and guide 7; external blade cutting guide 8; and tongue cut and guide 9 are incorporated onto the one base 27. It is acknowledged that to complete a whip and tongue graft, only one of the two slant cut facilities are required, and therefore another embodiment of the invention consists of one slanting cut facility and the tongue cut facility. In another embodiment, the three components of the invention may be detachable from one another, allowing for only the needed component to be available.

The tool can be made from many different materials, which will be obvious to the skilled reader. These include, but are not limited to: moulded and/or machined plastics, alloys, natural and/or composite wood, and any combination thereof.

Though the tool has been described with respect to whip and tongue grafting methods, it should be obvious to the skilled reader that the tool is not limited to this and may be used for other grafting and cutting applications, including but not limited to rind grafts, 'v' cleft grafts, wedge grafts, and chip buds.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described.

Accordingly, departures may be made from such details without departure from the spirit or scope of the Applicant's general inventive concept.

The invention claimed is:

1. A combined cutting and grafting tool comprising:
   a. a base;
   b. a cutting tool for cutting a stem into two parts, the cutting tool comprising
      i. at least one cutting guide mounted on the base for positioning the stem at a desired angle; and
      ii. at least one cutting blade pivotally mounted with respect to the base and vertically movable about a bearing relative to the cutting guide so as to cut across the width of the stem at an angle set by the cutting guide; and
   c. a grafting tool mounted on the base for providing a tongue cut for grafting, comprising:
      i. at least one grafting guide for guiding a cut stem to be grafted in a desired direction; and
      ii. at least one stationary grafting blade held such that when a cut stem is guided along the grafting guide the cutting edge forms a longitudinal cut along the stem, wherein the grafting guide and cutting guide are displaced from each other along the base.

2. A combined cutting and grafting tool as per claim 1, where there is one mounted grafting blade and one grafting guide for performing the tongue cut.

3. A combined cutting and grafting tool as per claim 1 where the position of the cutting blade for providing a slanting cut is fixed relative to the cutting guide.

4. A combined cutting and grafting tool according to claim 1, where the width of the grafting guide is adjustable.

5. A combined cutting and grafting tool according to claim 1 where the width of the grafting guide is fixed.

6. A combined cutting and grafting tool according to claim 1 where the tool is made from one or a combination of molded plastics, machined plastics, alloys, natural wood, and composite wood.

7. A combined cutting and grafting tool according to claim 1, where the position of at least one cutting guide is adjustable to accommodate stems of different sizes.

8. A combined cutting and grafting tool according to claim 1, where the at least one cutting guide is fixed relative to the base during cutting.

9. A combined cutting and grafting tool according to claim 1 where the angle of the cutting guide to the body is fixed.

10. A combined cutting and grafting tool according to claim 1 where the angle of the cutting guide to the body is adjustable.

11. A combined cutting and grafting tool according to claim 1 where the cutting blade is a knife blade or saw blade.

12. A combined cutting and grafting tool according to claim 1, where the cutting tool and grafting tool are detachable from one another.

* * * * *

UNITED STATES PATENT AND TRADEMARK OFFICE
CERTIFICATE OF CORRECTION

PATENT NO.        : 9,179,604 B2                                    Page 1 of 1
APPLICATION NO.   : 13/375963
DATED             : November 10, 2015
INVENTOR(S)       : Ian William Adams It is certified that error appears in the above-identified patent and that said Letters Patent is hereby corrected as shown below:

In the Claims,

Column 4, Claim 4, lines 32-33, please delete "Claim I" and insert --Claim 1--.

Column 4, Claim 6, lines 36-37, please delete "Claim I" and insert --Claim 1--.

Signed and Sealed this
Twenty-third Day of August, 2016

Michelle K. Lee
*Director of the United States Patent and Trademark Office*